(12) United States Patent
Yang et al.

(10) Patent No.: US 9,203,486 B2
(45) Date of Patent: Dec. 1, 2015

(54) METHOD, DEVICE, AND SYSTEM FOR TRANSMITTING CHANNEL INFORMATION

(71) Applicant: Huawei Technologies Co., Ltd., Shenzhen, Guangdong (CN)

(72) Inventors: Xun Yang, Shenzhen (CN); Yunbo Li, Shenzhen (CN); Tianyu Wu, Shenzhen (CN); Hufei Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/087,528

(22) Filed: Nov. 22, 2013

(65) Prior Publication Data
US 2014/0080420 A1  Mar. 20, 2014

Related U.S. Application Data

(63) Continuation of application No. PCT/CN2012/072997, filed on Mar. 26, 2012.

(30) Foreign Application Priority Data

Jun. 1, 2011 (CN) .......................... 2011 1 0145863
Jul. 20, 2011 (CN) .......................... 2011 1 0203896

(51) Int. Cl.
  *H04B 17/00* (2015.01)
  *H04J 3/16* (2006.01)
  (Continued)

(52) U.S. Cl.
  CPC ............ *H04B 7/0417* (2013.01); *H04B 7/0617* (2013.01); *H04B 7/0626* (2013.01); *H04L 51/043* (2013.01); *H04W 72/1231* (2013.01); *H04W 72/1236* (2013.01); *Y02B 60/50* (2013.01)

(58) Field of Classification Search
  CPC .. H04B 7/0417; H04B 7/0619; H04B 7/0626; H04B 7/0632; H04B 7/0643; H04W 72/1226; H04W 72/1231; H04W 72/1236; H04W 72/1284; H04W 72/1289

USPC .................... 455/68, 69, 226.1, 226.2, 226.3; 370/278, 468, 470
See application file for complete search history.

(56) References Cited

U.S. PATENT DOCUMENTS 5,371,734 A * 12/1994 Fischer ......................... 370/311
7,369,511 B2    5/2008 Utsunomiya et al.
(Continued)

FOREIGN PATENT DOCUMENTS

CN    1638307 A    7/2005
CN    101461193 A  2/2008
(Continued)

OTHER PUBLICATIONS

"Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6 GHz," IEEE P802.11ac™/D1.3, IEEE, New York, New York (Nov. 2011).

(Continued)

*Primary Examiner* — Duc M Nguyen
(74) *Attorney, Agent, or Firm* — Leydig, Voit & Mayer, Ltd.

(57) ABSTRACT

The present invention discloses a method, device, and system for transmitting channel information, pertaining to the field of radio communication. The method for obtaining channel information includes: transmitting, by a beamformer, a request for obtaining channel information to a beamformee within the duration of a current first TXOP; receiving a null feedback frame transmitted by the beamformee within the duration of the current first TXOP; within the validity period of the channel information, if the beamformer obtains a second TXOP, transmitting, within the second TXOP, a channel information indication frame to request the channel information, and receiving the channel information transmitted by the beamformee. The system includes a beamformer and a beamformee. The present invention saves the signaling resources of the beamformer and reduces the power consumption of the beamformee.

13 Claims, 10 Drawing Sheets

(51) Int. Cl.
*H04B 7/04* (2006.01)
*H04L 12/58* (2006.01)
*H04B 7/06* (2006.01)
*H04W 72/12* (2009.01)

(56) References Cited

U.S. PATENT DOCUMENTS

| | | | |
|---|---|---|---|
| 7,969,921 B2 * | 6/2011 | Singh et al. | 370/278 |
| 8,730,960 B2 * | 5/2014 | Hart et al. | 370/390 |
| 2004/0224677 A1 * | 11/2004 | Kuchibhotla et al. | 455/422.1 |
| 2005/0054359 A1 * | 3/2005 | Ishii et al. | 455/513 |
| 2005/0135307 A1 * | 6/2005 | Yang et al. | 370/329 |
| 2007/0097910 A1 | 5/2007 | Ji et al. | |
| 2007/0258384 A1 * | 11/2007 | Sammour et al. | 370/252 |
| 2008/0037496 A1 * | 2/2008 | Smith et al. | 370/340 |
| 2008/0045153 A1 * | 2/2008 | Surineni et al. | 455/63.1 |
| 2008/0062944 A1 * | 3/2008 | Smith et al. | 370/342 |
| 2008/0112351 A1 * | 5/2008 | Surineni et al. | 370/312 |
| 2009/0046667 A1 * | 2/2009 | Pelletier et al. | 370/335 |
| 2009/0323847 A1 | 12/2009 | Na et al. | |
| 2010/0069083 A1 * | 3/2010 | Wei et al. | 455/452.2 |
| 2010/0135236 A1 * | 6/2010 | Wang et al. | 370/329 |
| 2010/0208781 A1 | 8/2010 | Wentink et al. | |
| 2010/0273499 A1 * | 10/2010 | van Rensburg et al. | 455/450 |
| 2011/0149882 A1 * | 6/2011 | Gong et al. | 370/329 |
| 2011/0310870 A1 * | 12/2011 | Van Nee et al. | 370/338 |
| 2012/0127899 A1 | 5/2012 | Ketchum et al. | |
| 2013/0028243 A1 * | 1/2013 | Wentink et al. | 370/338 |
| 2013/0188567 A1 * | 7/2013 | Wang et al. | 370/329 |
| 2014/0146751 A1 * | 5/2014 | Jiang et al. | 370/328 |

FOREIGN PATENT DOCUMENTS

| | | |
|---|---|---|
| CN | 101479958 A | 7/2009 |
| CN | 102025707 A | 4/2011 |
| RU | 2407156 C2 | 12/2010 |
| WO | 2007117949 A1 | 10/2007 |
| WO | 2010095061 A1 | 8/2010 |
| WO | WO 2011035207 A2 | 3/2011 |

OTHER PUBLICATIONS

"IEEE Standard for Information Technology; Telecommunications and Information Exchange Between Systems; Local and Metropolitan Area Networks: Specific Requirements," IEEE Std 802.11, pp. 1-1232, Institute of Electrical and Electronics Engineers, New York, New York (2007).

Stacey et al., "IEEE P802.11; Wireless LANs; Proposed TGac Draft Amendment," IEEE 802.11-10/1361r3, Institute of Electrical and Electronics Engineers, New York, New York, (Jan. 18, 2011).

Merlin et al., "Sounding Protocol—Segmentation and Null Feedback," IEEE 802.11-11/0041r0, Slides 1-18, Institute of Electrical and Electronics Engineers, New York, New York (Jan. 18, 2011).

* cited by examiner

METHOD, DEVICE, AND SYSTEM FOR TRANSMITTING CHANNEL INFORMATION

CROSS-REFERENCE TO RELATED APPLICATIONS

This application is a continuation of International Patent Application No. PCT/CN2012/072997, filed on Mar. 26, 2012, which claims priority to Chinese Patent Application No. 201110145863.4, filed on Jun. 1, 2011 and Chinese Patent Application No. 201110203896.X, filed on Jul. 20, 2011, all of which are hereby incorporated by reference in their entireties.

FIELD OF THE INVENTION

The present invention relates to the field of radio communication, and in particular, to a method for obtaining channel information, a method for transmitting channel information, a beamformer, a beamformee, and a system.

BACKGROUND OF THE INVENTION

In a radio communication system, the use of the MIMO (Multiple-Input Multiple-Output) technology and the beamforming technology makes channel information indispensable. A beamformer obtains channel information using the feedback from a beamformee, and uses the channel information as a reference for subsequent data transmission.

In the conventional art, the process of obtaining the channel information by the beamformer is as follows: The beamformer transmits an NDPA (Null Data Packet Announcement) and an NDP (Null Data Packet) to a beamformee to request the channel information; after receiving the NDPA and the NDP, the beamformee estimates the channel between the beamformer and the beamformee, and transmits the channel information to the beamformer according to a rule. When the beamformer obtains multi-user channel information, for beamformees other than the first one, a Sounding Poll frame may be transmitted to instruct the other beamformees to feed back their channel information.

The beamformer, before transmitting data each time, obtains a TXOP (Transmission opportunity) in a contention mode, and then transmits data within the duration corresponding to the TXOP. When the beamformer requests the channel information within the duration of a TXOP, if the channel information obtained by the beamformee fails to be completely transmitted before the duration of the TXOP ends, the beamformee may feed back a null feedback frame to notify the beamformer that the channel information cannot be fed back currently and the cause thereof, and meanwhile, the beamformee discards the estimated channel information. If the beamformer still needs the channel information, the beamformer can only retransmit a channel estimation request after obtaining a TXOP again, and the beamformee performs channel estimation again and then transmits the channel information to the beamformer.

During the implementation of the present invention, the inventor finds that the prior art has at least the following disadvantages:

The beamformer repeatedly transmits the NDPA and the NDP to request the channel information, causing a low efficiency and a waste of the resources. In addition, the beamformee repeatedly performs the channel estimation, causing a power waste.

SUMMARY OF THE INVENTION

Embodiments of the present invention provide a method for obtaining channel information, a method for transmitting channel information, a beamformer, a beamformee, and a system.

In one aspect, an embodiment of the present invention provides a method for obtaining channel information, including:

transmitting, by a beamformer, a request for obtaining channel information to a beamformee within the duration of a current first transmission opportunity TXOP; and receiving, by the beamformer, a null feedback frame transmitted by the beamformee within the duration of the current first TXOP; within the validity period of the channel information, if the beamformer obtains a second TXOP, transmitting, within the duration of the second TXOP, a channel information indication frame to the beamformee to request the channel information, and receiving the channel information transmitted by the beamformee.

In addition, an embodiment of the present invention provides another method for obtaining channel information, including:

transmitting, by a beamformer, a request for obtaining channel information to a beamformee within the duration of a current first transmission opportunity TXOP; and receiving, by the beamformer, a first channel information segment transmitted by the beamformee within the duration of the first TXOP; if the beamformer obtains a third TXOP, transmitting, within the duration of the third TXOP, a channel information indication frame to the beamformee to request the remaining channel information segments, and receiving a second channel information segment transmitted by the beamformee.

In another aspect, an embodiment of the present invention provides a method for transmitting channel information, including:

receiving, by a beamformee, a request for obtaining channel information, where the request is transmitted by a beamformer within the duration of a current first transmission opportunity TXOP;

performing, by the beamformee, channel estimation to obtain the channel information, and determining that the remaining duration of the first TXOP is insufficient for transmitting the channel information, where the remaining duration of the first TXOP is the duration from the current time to the time when the first TXOP ends; and transmitting, by the beamformee, a null feedback frame to the beamformer within the remaining duration of the first TXOP; within the validity period of the channel information, if the beamformee obtains a second TXOP, transmitting, within the duration of the second TXOP, the channel information to the beamformer; or segmenting, by the beamformee, the channel information into a first channel information segment and a second channel information segment, transmitting the first channel information segment to the beamformer within the remaining duration of the first TXOP, and after the beamformee obtains a third TXOP, transmitting the second channel information segment to the beamformer within the duration of the third TXOP.

In addition, an embodiment of the present invention provides another method for transmitting channel information, including:

receiving, by a beamformee, a request for obtaining channel information, where the request is transmitted by a beamformer within the duration of a current first transmission opportunity TXOP;

performing, by the beamformee, channel estimation to obtain the channel information, and determining that the remaining duration of the first TXOP is insufficient for transmitting the channel information, where the remaining duration of the first TXOP is the duration from the current time to the time when the first TXOP ends; and transmitting, by the beamformee, a null feedback frame to the beamformer within the remaining duration of the first TXOP; within the validity period of the channel information, if the beamformer obtains a second TXOP and transmits a channel information indication frame, transmitting, by the beamformee, the channel information to the beamformer; or segmenting, by the beamformee, the channel information into a first channel information segment and a second channel information segment, transmitting the first channel information segment to the beamformer within the remaining duration of the first TXOP, and transmitting the second channel information segment to the beamformer after the beamformer obtains a third TXOP and transmits a channel information indication frame.

In still another aspect, an embodiment of the present invention provides a beamformer, including a transmitting module and a receiving module; where:

the transmitting module is configured to transmit a request for obtaining channel information to a beamformee within the duration of a current first transmission opportunity TXOP; after the receiving module receives a null feedback frame, if the beamformer obtains, within the validity period of the channel information, a second TXOP, transmit, within the duration of the second TXOP, a channel information indication frame to the beamformee to request the channel information; and the receiving module is configured to receive a null feedback frame transmitted by the beamformee within the duration of the first TXOP and receive the channel information transmitted by the beamformee within the duration of the second TXOP.

In addition, an embodiment of the present invention provides another beamformer, including a transmitting module and a receiving module; where:

the transmitting module is configured to transmit a request for obtaining channel information to a beamformee within the duration of a current first transmission opportunity TXOP; after the receiving module receives a first channel information segment, if the beamformer obtains a third TXOP, transmit, within the duration of the third TXOP, a channel information indication frame to the beamformee to request the remaining channel information segments; and the receiving module is configured to receive the first channel information segment transmitted by the beamformee within the duration of the first TXOP, and receive a second channel information segment transmitted by the beamformee within the duration of the third TXOP.

In yet another aspect, an embodiment of the present invention provides a beamformee, including:

a receiving module, configured to receive a request for obtaining channel information, where the request is transmitted by a beamformer within the duration of a current first transmission opportunity TXOP;

a channel estimation module, configured to perform, after the receiving module receives the request, channel estimation to obtain the channel information, and determine that the remaining duration of the first TXOP is insufficient for transmitting the channel information, where the remaining duration of the first TXOP is the duration from the current time to the time when the first TXOP ends; and a transmitting module, configured to transmit a null feedback frame to the beamformer within the remaining duration of the first TXOP; within the validity period of the channel information, if the beamformee obtains a second TXOP, transmit, within the duration of the second TXOP, the channel information to the beamformer; or segment the channel information into a first channel information segment and a second channel information segment, transmit the first channel information segment to the beamformer within the remaining duration of the first TXOP, and after the beamformee obtains a third TXOP, transmit the second channel information segment to the beamformer within the duration of the third TXOP.

In addition, an embodiment of the present invention provides another beamformee, including:

a receiving module, configured to receive a request for obtaining channel information, where the request is transmitted by a beamformer within the duration of a current first transmission opportunity TXOP;

a channel estimation module, configured to perform channel estimation to obtain the channel information, and determine that the remaining duration of the first TXOP is insufficient for transmitting the channel information, where the remaining duration of the first TXOP is the duration from the current time to the time when the first TXOP ends; and a transmitting module, configured to transmit a null feedback frame to the beamformer within the remaining duration of the first TXOP; within the validity period of the channel information, if the beamformer obtains a second TXOP and transmits a channel information indication frame, transmit the channel information to the beamformer; or configured to segment the channel information into a first channel information segment and a second channel information segment, transmit the first channel information segment to the beamformer within the remaining duration of the first TXOP, and transmit the second channel information segment to the beamformer after the beamformer obtains a third TXOP and transmits a channel information indication frame.

In still yet another aspect, an embodiment of the present invention provides a system for transmitting channel information, including any one of the above beamformers and any one of the above beamformees.

The method for obtaining channel information, the method for transmitting channel information, the beamformer, the beamformee, and the system provided in the embodiments of the present invention produce the following beneficial effects:

The beamformer transmits the channel information indication frame to request the channel information again, and receives the channel information or channel information segments transmitted by the beamformee, which prevents the beamformer from repeatedly transmitting an NDPA and an NDP to request the channel information, improves the efficiency, and saves the signaling resources. In addition, the beamformee prevents repeated channel estimation and reduces power consumption.

DETAILED DESCRIPTION OF THE EMBODIMENTS

To make the objectives, technical solutions, and advantages of the present invention clearer, the following further describes the embodiments of the present invention in detail with reference to the accompanying drawings.

Embodiments of the present invention relate to the beamforming technology, and may be applied in a wireless local area network system. The device using the beamforming technology may be a STA (Station). The STA includes, but is not limited to, a mobile phone terminal, a laptop computer, and an AP (Access Point). When a STA uses the beamforming technology to transmit data, the STA may be referred to as a beamformer; when a STA uses the beamforming technology to receive data, the STA may be referred to as a beamformee.

The embodiments of the present invention may be applied to a radio communication system for obtaining the right to use a channel based on the contention mode. The device that first obtains the right to use the channel through contention may first use the channel to transmit data. The obtained right to use the channel through contention may be referred to as a transmission opportunity TXOP. After a device obtains the TXOP through contention, the duration corresponding to the TXOP may be set. Different durations may be set for different TXOPs, for example, 4 ms or 5 ms. At any time point within the duration of the TXOP, the device can transmit data. If the TXOP ends, the device can no longer use the channel, and can only obtain the right to use the channel through contention again. The embodiments of the present invention involve the TXOP in several occasions. For ease of description, different TXOPs may be referred to as a first TXOP, a second TXOP, and a third TXOP. The "first", "second", and "third" are only used to distinguish different TXOPs and do not represent a time sequence of the TXOPs and is irrelevant to the time when the TXOPs are obtained. In addition, the "first", "second", and "third" are described only for the devices in a radio communication system, regardless of whether the devices are beamformers or beamformees.

Figure 1:
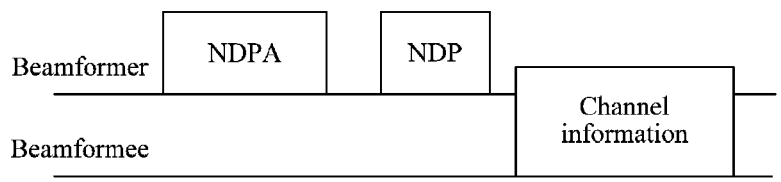
FIG. 1 is a schematic flow chart of obtaining channel information using an NDPA and an NDP according to an embodiment of the present invention.

In the embodiments of the present invention, the beamformer may transmit an NDPA and an NDP to the beamformee to request to obtain the channel information. After receiving the NDPA and the NDP, the beamformee estimates the channel between the beamformer and the beamformee, and transmits the obtained channel information to the beamformer. This process may be referred to as channel sounding, as shown in FIG. 1. FIG. 1 is a single-user Channel Sounding process, referring to channel information transmission between a beamformer and a beamformee. The channel information obtaining involved in the embodiments of the present invention may also be a multiple-user Channel Sounding process, referring to that a beamformer obtains the channel information from multiple beamformees.

Figure 2A:
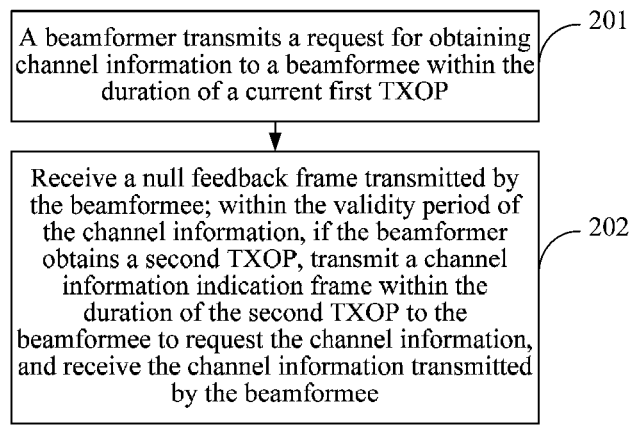
FIG. 2a is a flow chart of a method for obtaining channel information according to an embodiment of the present invention.

Referring to FIG. 2a, this embodiment provides a method for obtaining channel information, including the following steps:

201. A beamformer transmits a request for obtaining channel information to a beamformee within the duration of a current first transmission opportunity TXOP.

202. The beamformer receives a null feedback frame transmitted by the beamformee within the duration of the current first TXOP; within the validity period of the channel information, if the beamformer obtains a second TXOP, transmits, within the duration of the second TXOP, a channel information indication frame to the beamformee to request the channel information, and receives the channel information transmitted by the beamformee.

Figure 2B:
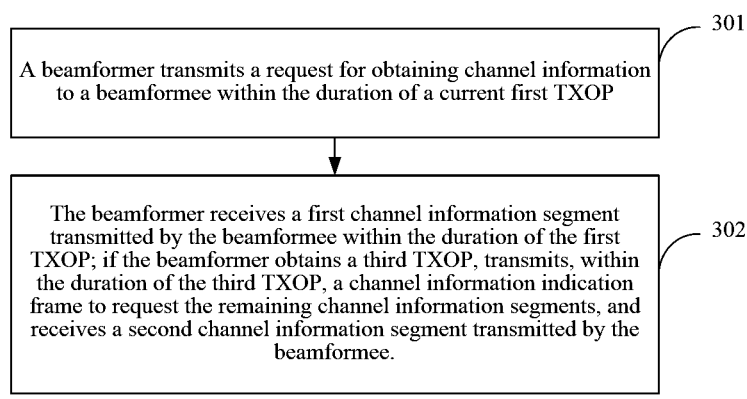
FIG. 2b is a flow chart of another method for obtaining channel information according to an embodiment of the present invention.

In addition, referring to FIG. 2b, this embodiment provides another method for obtaining channel information, including the following steps:

301. A beamformer transmits a request for obtaining channel information to a beamformee within the duration of a current first transmission opportunity TXOP.

302. The beamformer receives a first channel information segment transmitted by the beamformee within the duration of the first TXOP; if the beamformer obtains a third TXOP, transmits, within the duration of the third TXOP, a channel information indication frame to the beamformee to request the remaining channel information segments, and receives a second channel information segment transmitted by the beamformee.

The first channel information segment and the second channel information segment are obtained after the beamformee segments the channel information.

In this embodiment, optionally, the channel information indication frame may include an indication information element, used for identifying the channel information. Specifically, the indication information element may be a Sounding Sequence.

In this embodiment, the channel information indication frame may be implemented in multiple forms, which include, but are not limited to, Sounding Poll frame, and Beamforming Report Poll frame, which are not limited in the embodiments of the present invention.

In this embodiment, the obtaining by the beamformer the second TXOP may be specifically as follows: When the first TXOP ends, the beamformer obtains the right to use the channel, the second TXOP, prior to all other STAs. In this way, the channel information of the beamformee may be obtained by transmitting the channel information indication frame. The obtaining by the beamformer the third TXOP may be specifically as follows: When the first TXOP ends, the beamformer first obtains the right to use the channel, the third TXOP, prior to all other STAs. In this way, the remaining channel information segments may be obtained by transmitting the channel information indication frame.

Any method for obtaining channel information in the embodiments may be applied to single-user channel information feedback, and may also be applied to multiple-user channel information feedback, for example, two-user channel information feedback or three-user channel information feedback. In a multiple-user scenario, the beamformer may use the above method to request the channel information from any one of the multiple beamformees, which is not detailed herein.

Figure 3:
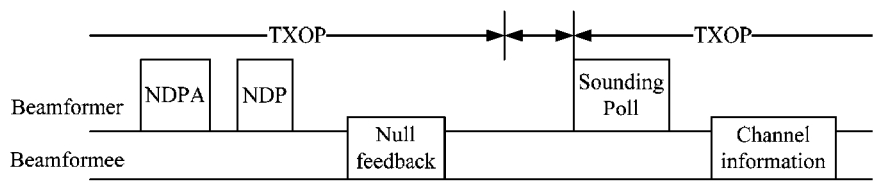
FIG. 3 is a schematic flow chart of obtaining channel information within a new TXOP of a beamformer by using Sounding Poll in a single-user scenario according to an embodiment of the present invention.

FIG. 3 is a schematic flow chart of single-user channel information feedback. A beamformer transmits an NDPA and an NDP to a beamformee within the current TXOP to request channel information, and receives a null feedback frame transmitted by the beamformee. After a period of time, the beamformer obtains a new TXOP prior to all other STAs, transmits a Sounding Poll indication frame within the new TXOP to the beamformee to request the previous channel information again, and receives the estimated channel information between the beamformer and the beamformee from the beamformee. The process in FIG. 3, compared with that the beamformer retransmits an NDPA and an NDP in the prior art, saves the time overhead, that is, length (NDPA+NDP+SIFS)−length (Sounding Poll). The "length" indicates the time required for transmitting a frame or a frame interval, and SIFS (Short Inter-Frame Space) indicates the frame interval between two adjacent frames.

Figure 4:
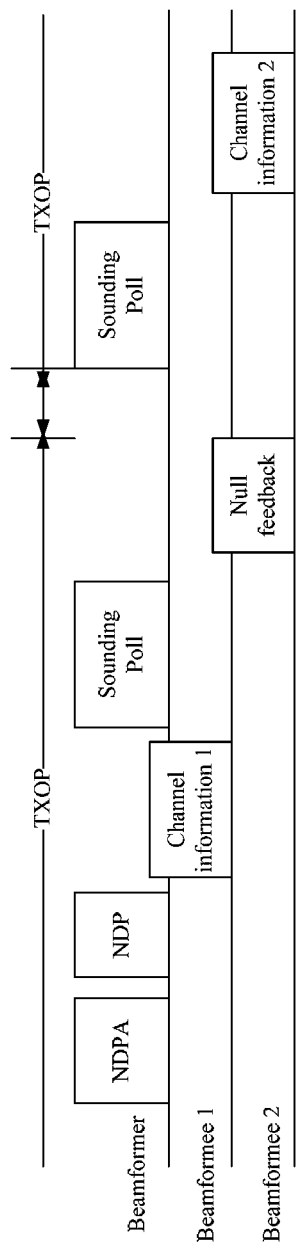
FIG. 4 is a schematic flow chart of obtaining channel information within a new TXOP of a beamformer by using Sounding Poll in a multiple-user scenario according to an embodiment of the present invention.

FIG. 4 is a schematic flow chart of two-user channel information feedback. A beamformer transmits an NDPA and an NDP within the current TXOP to a beamformee 1 to request channel information 1, and receives the channel information 1 between the beamformer and the beamformee 1 fed back from the beamformee 1. The beamformer transmits a Sounding Poll indication frame to a beamformee 2 within the current TXOP to request channel information 2, and receives a null feedback frame transmitted by the beamformee 2. After a period of time, the beamformer obtains a new TXOP prior to all other STAs, transmits a Sounding Poll indication frame within the new TXOP to the beamformee 2 to request the previous channel information 2 again, and receives the channel information 2 between the beamformer and the beamformee 2 fed back from the beamformee 2.

The validity period of the channel information involved in the embodiments of the present invention refers to the maximum time during which the beamformer is capable of effective beamforming by using the channel information. During the validity period, the beamformee stores the channel information. If the validity period expires, the beamformee discards the channel information. Generally, the validity period of the channel information is a monotonic increasing function of the channel coherence time. The validity period of the channel information may be preconfigured, or may be negotiated between the beamformer and the beamformee. Exemplarily, the validity period of the channel information is longer than the duration of the TXOP. For example, the beamformer and the beamformee may preconfigure the validity period of the channel information to a default value accepted by the two parties, for example, 25 ms, which is, however, not limited in the embodiments of the present invention.

In another embodiment of the present invention, the method for obtaining channel information may further include:

transmitting, by the beamformer, management signaling to the beamformee, where the management signaling includes an indication information element used for indicating that the beamformer has the capability of receiving the currently requested channel information or channel information segments within a subsequent TXOP. Specifically, the indication information element may be a bit or field newly added in the capability field of the management signaling. The indication information element may enable the beamformee to know that the beamformer may wait for the channel information so that the beamformee does not discard the estimated channel information, which prevents the power waste caused by repeated channel information estimation.

The beamformer having the above capability may use a channel information indication frame within the validity period of the channel information to request the channel information again, or may use the existing method to retransmit the NDPA and the NDP to request the channel information, which is not limited in the embodiments of the present invention.

According to the method for obtaining channel information in the embodiments, the beamformer transmits the channel information indication frame to request the channel information again, and receives the channel information or channel information segments transmitted by the beamformee, which prevents the beamformer from repeatedly transmitting the NDPA and the NDP to request the channel information, improves the efficiency, and saves the signaling resources.

In addition, the beamformer may transmit the management signaling to the beamformee to indicate that the beamformer has the capability of receiving the currently requested channel information or channel information segments within a subsequent TXOP, so that the beamformee does not discard the estimated channel information, which prevents the power waste caused by repeated channel information estimation. The segmentation may further reduce the time overhead.

Figure 5:
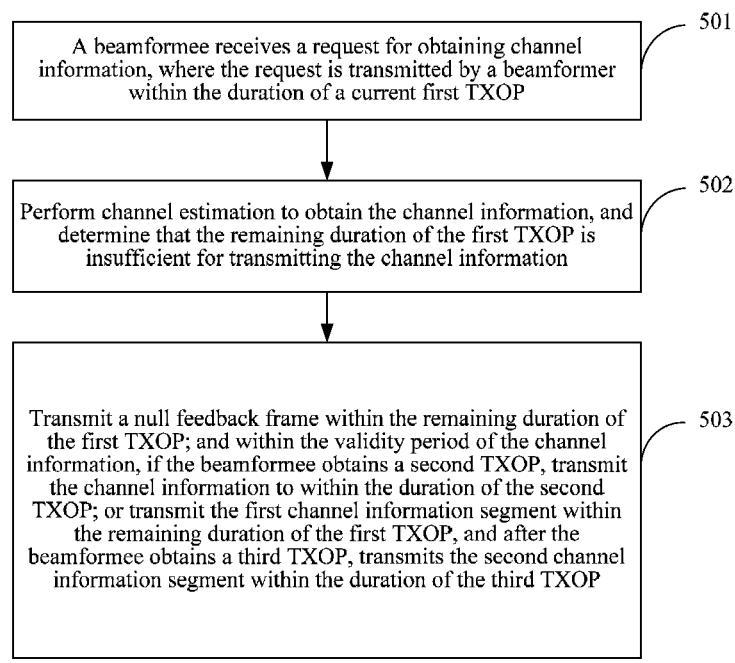
FIG. 5 is a flow chart of a method for transmitting channel information according to an embodiment of the present invention.

Referring to FIG. 5, this embodiment provides a method for transmitting channel information, including the following steps:

501. A beamformee receives a request for obtaining channel information, where the request is transmitted by a beamformer within the duration of a current first transmission opportunity TXOP.

502. The beamformee performs channel estimation to obtain the channel information, and determines that the remaining duration of the first TXOP is insufficient for transmitting the channel information, where the remaining duration of the first TXOP is the duration from the current time to the time when the first TXOP ends.

503. The beamformee transmits a null feedback frame to the beamformer within the remaining duration of the first TXOP; and within the validity period of the channel information, if the beamformee obtains a second TXOP, transmits the channel information to the beamformer within the duration of the second TXOP; or the beamformee segments the channel information into a first channel information segment and a second channel information segment, transmits the first channel information segment to the beamformer within the remaining duration of the first TXOP, and after the beamformee obtains a third TXOP, transmits the second channel information segment to the beamformer within the duration of the third TXOP. In this embodiment, if the total duration of the channel information exceeds the remaining duration of the first TXOP, the beamformee may select to transmit the channel information by segment, and transmit a channel information segment allowed by the remaining duration of the first TXOP. For example, the channel information is segmented into five segments; when the duration of the current first TXOP only allows transmission of two segments, the beamformee transmits two segments within the duration of the first TXOP, and transmits the remaining three segments within the subsequent third TXOP, thereby reducing the time overhead.

At least one of the channel information, the first channel information segment, and the second channel information segment is transmitted together with data information to the beamformer.

Further, in practical applications, in step 502, the channel information of the beamformee may have already been obtained before the request is received. Therefore, the beamformee might no longer need to perform channel estimation to obtain the channel information.

In this embodiment, the beamformee may obtain the second TXOP and the third TXOP prior to that all other STAs obtain the TXOP. To be specific, the beamformee obtains the right to use the channel prior to all other STAs so that the beamformee actively transmits the channel information or channel information segments to the beamformer without the need of a request from the beamformer.

In another embodiment of the present invention, after the beamformee transmits the channel information, the first channel information segment, or the second channel information segment, the method may further include:

receiving, by the beamformee, an acknowledgment ACK frame or a block acknowledgment (BA, Block ACK) frame returned by the beamformer. The ACK and BA are both used to indicate that the beamformer correctly receives the channel information. The difference lies in that the beamformer returns an ACK frame upon receiving a piece of information, for example, returns an ACK frame upon receiving the channel information or one segment; the beamformer returns a BA upon receiving multiple pieces of channel information, for example, returns a BA upon receiving the channel information and data information, or returns a BA upon receiving two segments.

The above method provided in the embodiments of the present invention may be applied to single-user channel information feedback, or multiple-user channel information feedback. The following uses multiple-user channel information feedback as an example for description.

Figure 6:
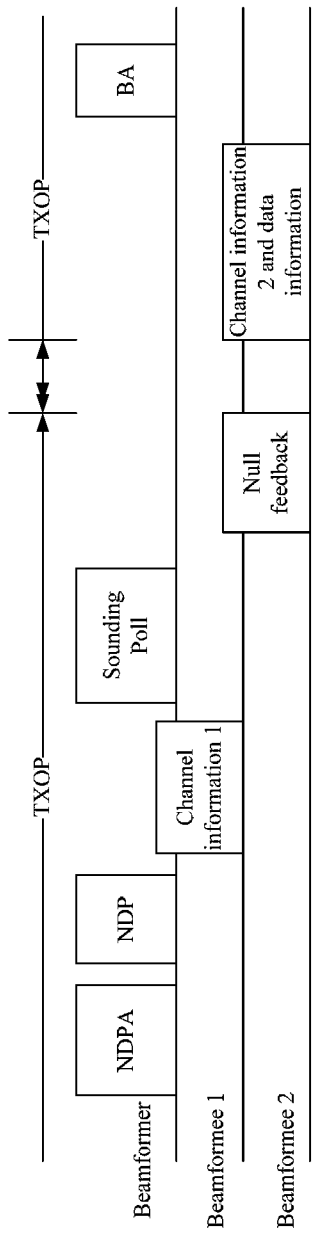
FIG. 6 is a schematic flow chart of transmitting channel information within a new TXOP of a beamformee in a multiple-user scenario according to an embodiment of the present invention.

FIG. 6 is a flow chart of two-user channel information feedback, where the segmentation mode is not used. A beamformer transmits an NDPA and an NDP within the current TXOP to a beamformee 1 to request channel information 1, and receives the channel information 1 between the beamformer and the beamformee 1 from the beamformee 1. The beamformer transmits a Sounding Poll indication frame to a beamformee 2 within the current TXOP to request channel information 2, and receives a null feedback frame transmitted by the beamformee 2. After a period of time, the beamformee 2 obtains a new TXOP prior to all other STAs, actively transmits, within the new TXOP, the estimated channel information 2 between the beamformer and the beamformee 2, and transmits the channel information 2 and data information to the beamformer. After receiving the channel information 2 and data information, the beamformer returns a BA to the beamformee 2, indicating that the channel information 2 and data information are correctly received. The process illustrated in FIG. 6, compared with that the beamformer retransmits an NDPA and an NDP in the prior art, saves the time overhead, that is, length (NDPA+NDP+SIFS×2). If the channel information is transmitted separately, instead of being transmitted with the data information, the saved time overhead is length (NDPA+NDP+SIFS)−length (ACK).

Figure 7:
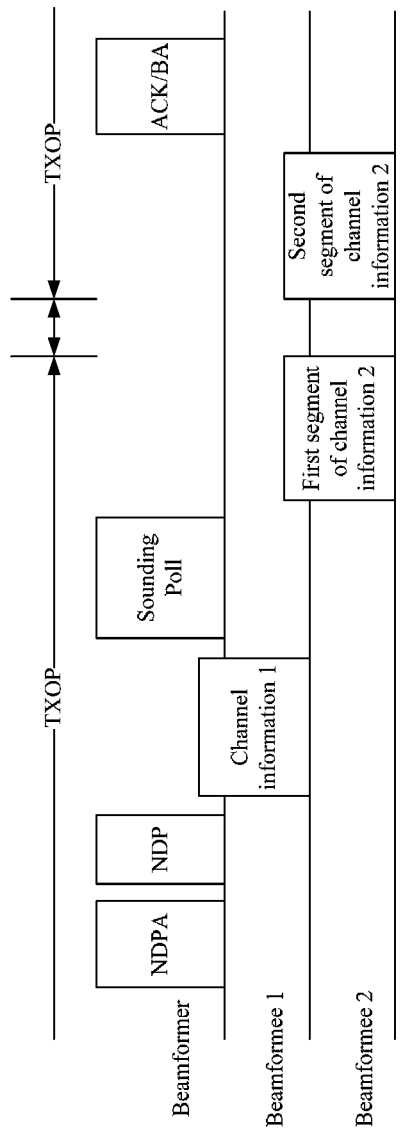
FIG. 7 is a schematic flow chart of transmitting channel information segments within a new TXOP of a beamformee in a multiple-user scenario according to an embodiment of the present invention.

FIG. 7 is a flow chart of two-user channel information feedback, where the segmentation mode is used. A beamformer transmits an NDPA and an NDP within the current TXOP to a beamformee 1 to request channel information 1, and receives the channel information 1 between the beamformer and the beamformee 1 from the beamformee 1. The beamformer transmits a Sounding Poll indication frame to a beamformee 2 within the current TXOP to request channel information 2, and receives a first channel information segment transmitted by the beamformee 2. After a period of time, the beamformee 2 obtains a new TXOP prior to all other STAs, and actively transmits the remaining second channel information segment within the new TXOP; and the beamformer returns an ACK or a BA to the beamformee 2 after receiving the second channel information segment, indicating that the channel information is correctly received. The process illustrated in FIG. 7, compared with that the beamformer retransmits an NDPA and an NDP in the prior art, saves the time overhead, that is, length (NDPA+NDP+SIFS+first segment of the channel information 2)−length (ACK). If the channel information is transmitted with the data information, the saved time overhead is length (NDPA+NDP+SIFS×2+first segment of the channel information 2).

In another embodiment of the present invention, the method may further include:

transmitting, by the beamformee, management signaling to the beamformer, where the management signaling includes an indication information element used for indicating that the beamformee has the capability of storing and transmitting the channel information or the channel information segments currently requested by the beamformer within a subsequent TXOP. Specifically, the indication information element may be a bit or field newly added in the capability field of the management signaling. The indication information element may enable the beamformer to know that the beamformee can store the estimated channel information and to wait for the feedback, so that the beamformer may transmit a channel information indication frame within the validity period of the channel information to request the channel information again, which prevents the beamformer from retransmiting a request using the channel information indication frame when the beamformee does not have the above capability causing a failure to obtain the channel information.

Of course, the beamformee having the above capability may actively feed back the stored channel information to the beamformer within the validity period of the channel information once the TXOP is obtained, or may use the existing method to for the beamformer to retransmit the NDPA and the NDP and then feed back the channel information, which is not limited in the embodiments of the present invention.

According to the method for transmitting channel information in the embodiments, the beamformee, if failing to transmit the channel information within the duration of the current first TXOP of the beamformer, transmits the channel information after obtaining the second TXOP, or transmits the first channel information segment within the remaining duration of the first TXOP, and transmits the second channel information segment after obtaining the third TXOP, which prevents the repeated channel estimation of the beamformee and reduces power consumption. In addition, the beamformee actively transmits the channel information to the beamformer, and the beamformer does not need to transmit the channel information indication frame, which saves the signaling resources.

In addition, the beamformee may transmit the management signaling to the beamformer to indicate that the beamformee has the capability of storing and transmitting the channel information or the channel information segments currently requested by the beamformer within a subsequent TXOP, which prevents the beamformer from retransmitting the NDPA and the NDP, improves the efficiency, and saves the signaling resources. The segmentation may further reduce the time overhead.

Figure 8:
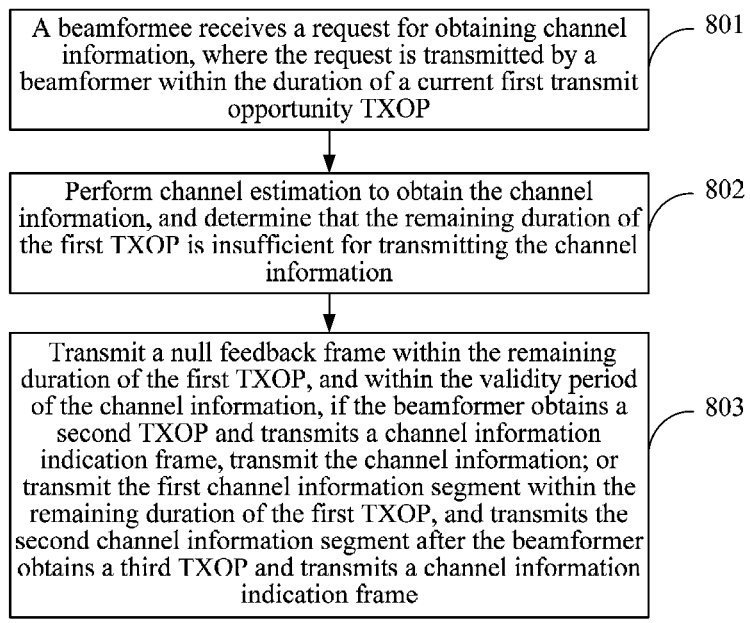
FIG. 8 is a flow chart of another method for transmitting channel information according to an embodiment of the present invention.

Referring to FIG. 8, this embodiment provides another method for transmitting channel information, including the following steps:

801. A beamformee receives a request for obtaining channel information, where the request is transmitted by a beamformer within the duration of a current first transmission opportunity TXOP.

802. The beamformee performs channel estimation to obtain the channel information, and determines that the remaining duration of the first TXOP is insufficient for transmitting the channel information, where the remaining duration of the first TXOP is the duration from the current time to the time when the first TXOP ends.

803. The beamformee transmits a null feedback frame to the beamformer within the remaining duration of the first TXOP. Within the validity period of the channel information, if the beamformer obtains a second TXOP and transmits a channel information indication frame, the beamformee transmits the channel information to the beamformer; or the beamformee segments the channel information into the first channel information segment and the second channel information segment, transmits the first channel information segment to the beamformer within the remaining duration of the first TXOP, and transmits the second channel information segment to the beamformer after the beamformer obtains a third TXOP and transmits a channel information indication frame.

At least one of the channel information, the first channel information segment, and the second channel information segment is transmitted with data information to the beamformer.

In this embodiment, the beamformer may obtain the second TXOP and the third TXOP prior to that all other STAs obtain the TXOP. To be specific, the beamformer obtains the right to use the channel prior to all other STAs so that the beamformer actively requests to obtain the channel information and transmits the channel information indication frame.

In another embodiment of the present invention, after the beamformee transmits the channel information, the first channel information segment, or the second channel information segment, the method may further include:

receiving, by the beamformee, an acknowledgment ACK frame or a block acknowledgment BA frame returned by the beamformer.

The above method provided in the embodiments of the present invention may be applied to single-user channel information feedback, or multiple-user channel information feedback. The following uses multiple-user channel information feedback as an example for description.

Figure 9:
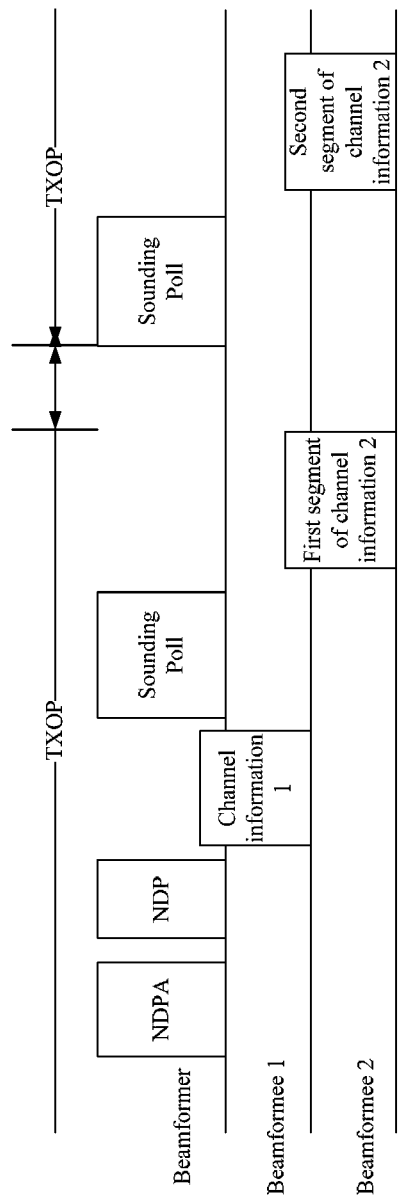
FIG. 9 is a schematic flow chart of transmitting channel information segments within a new TXOP of a beamformer in a multiple-user scenario according to an embodiment of the present invention.

FIG. 9 is a flow chart of two-user channel information feedback, where the segmentation mode is used. A beamformer transmits an NDPA and an NDP within the current TXOP to a beamformee 1 to request channel information 1, and receives the channel information 1 between the beamformer and the beamformee 1 from the beamformee 1. The beamformer transmits a Sounding Poll indication frame to a beamformee 2 within the current TXOP to request channel information 2, and receives a first segment of the channel information 2 transmitted by the beamformee 2. After a period of time, the beamformer obtains a new TXOP prior to all other STAs, and transmits a Sounding Poll indication frame within the new TXOP to request the remaining second segment of the channel information 2; and the beamformee 2 feeds back the second segment of the channel information 2 to the beamformer after receiving the second segment of the channel information 2. The process illustrated in FIG. 9, compared with that the beamformer retransmits the NDPA and the NDP in the prior art, saves the time overhead, that is, length (NDPA+NDP+SIFS)−length (Sounding Poll)+length (first segment of the channel information 2).

In another embodiment of the present invention, the method may further include:

transmitting, by the beamformee, management signaling to the beamformer, where the management signaling includes an indication information element used for indicating that the beamformee has the capability of storing and transmitting the channel information or the channel information segments currently requested by the beamformer within a subsequent TXOP. Specifically, the indication information element may be a bit or field newly added in the capability field of the management signaling. The indication information element may enable the beamformer to know that the beamformee can store the estimated channel information and to wait for the channel information feedback, so that the beamformer may transmit a channel information indication frame within the validity period of the channel information to request the channel information again, which prevents the beamformer from retransmitting a request using the channel information indication frame when the beamformee does not have the above capability, causing a failure to obtain the channel information.

The beamformee having the above capability may feed back the stored channel information to the beamformer within the validity period of the channel information if the beamformer obtains the TXOP and transmits a channel information indication frame, or may use the existing method to wait for the beamformer to retransmit the NDPA and the NDP and then feed back the channel information, which is not limited in the embodiments of the present invention.

According to the method for transmitting channel information in the embodiments, the beamformee, if failing to transmit the channel information within the duration of the current first TXOP of the beamformer, feeds back the channel information after the beamformer obtains the second TXOP and transmits the channel information indication frame; or segments the channel information into the first channel information segment and the second channel information segment, transmits the first channel information segment within the remaining duration of the first TXOP, and transmits the second channel information segment after the beamformer obtains the third TXOP and transmits the channel information indication frame, which prevents repeated channel estimation of the beamformee and reduces power consumption.

In addition, the beamformee may transmit the management signaling to the beamformer to indicate that the beamformee has the capability of storing and transmitting the channel information or the channel information segments currently requested by the beamformer within a subsequent TXOP so that the beamformer may request the channel information again by using the channel information indication frame within the validity period of the channel information, which prevents the beamformer from retransmitting the NDPA and the NDP, improves the efficiency, and saves the signaling resources. The segmentation may further reduce the time overhead.

Based on the above methods, further, in practice, the first TXOP may be insufficient for transmitting the channel information. In this case, the beamformer may determine whether the duration of the TXOP is sufficient and determine whether to request within a subsequent TXOP. Therefore, another embodiment provides a method for obtaining channel information, including the following steps:

S1101. A beamformer determines that the duration of a current first transmission opportunity TXOP is insufficient for receiving channel information.

S1102. Within the validity period of the channel information, if obtaining a second TXOP, the beamformer transmits a channel information indication frame within the duration of the second TXOP to the beamformee to request the channel information, and receives the channel information transmitted by the beamformee.

In this embodiment, if the beamformer determines that the duration of the current first transmission opportunity TXOP is insufficient for receiving the channel information and no other data is to be transmitted, the beamformer may select to terminate the TXOP, i.e., to truncate the TXOP.

The corresponding method for transmitting channel information may be illustrated in the following embodiment, including the following step:

S1202. Within the validity period of the channel information, if obtaining a second TXOP, the beamformee transmits the channel information to the beamformer within the duration of the second TXOP.

The method for transmitting channel information may also be illustrated in the following embodiment, including the following steps:

A beamformee feeds back a null feedback frame within the remaining duration of a first TXOP to the beamformer; within the validity period of the channel information, if a beamformer obtains a second TXOP, the beamformee transmits the channel information to the beamformer within the duration of the second TXOP. Alternatively, the validity period of the channel information is long, and the beamformee may obtain a second TXOP. In this case, the beamformee transmits the channel information to the beamformer within the duration of the second TXOP.

Alternatively, within the validity period of channel information, if obtaining a second TXOP, the beamformee transmits the channel information to the beamformer within the duration of the second TXOP.

Further, in practical applications, the remaining duration of a current first transmission opportunity TXOP may be insufficient for transmitting the channel information. In this case, the beamformer determines whether the duration of the first TXOP is sufficient and implements the segmentation in the request. In one of the following embodiments, the beamformer controls the progress of the channel information request and transmission.

In addition, this embodiment provides another method for obtaining channel information, including the following steps:

S2101. A beamformer determines that the remaining duration of the current first transmission opportunity TXOP is insufficient for transmitting channel information.

S2102: The beamformer transmits a request for obtaining channel information segments to a beamformee within the duration of the current first transmission opportunity TXOP.

S2103. The beamformer receives a first channel information segment transmitted by the beamformee within the duration of the first TXOP; if the beamformer obtains a third TXOP, transmits a channel information indication frame within the duration of the third TXOP to the beamformee to request the remaining channel information segments, and receives a second channel information segment transmitted by the beamformee.

The first channel information segment and the second channel information segment are obtained after the beamformee segments the channel information.

In this embodiment, if the total duration of the channel information exceeds the remaining duration of the first TXOP, the beamformer may select to transmit a segment request, and request the channel information segment allowed by the remaining duration within the duration of the first TXOP. For example, the channel information may be segmented into five segments; when the duration of the current first TXOP only allows transmission of two segments, the beamformer requests two segments within the duration of the first TXOP, and requests the remaining three segments within the subsequent third TXOP, thereby reducing the time overhead.

The corresponding method for transmitting channel information may be illustrated in the following embodiment, including the following steps:

S2201. A beamformee receives a request for obtaining channel information segments, where the request is transmitted by a beamformer within the duration of a current first transmission opportunity TXOP.

S2202. The beamformee segments the channel information into the first channel information segment and the second channel information segment, transmits the first channel information segment to the beamformer within the remaining duration of the first TXOP, and transmits the second channel information segment to the beamformer after the beamformer obtains a third TXOP and transmits a channel information indication frame.

The corresponding method for transmitting channel information may also be illustrated in the following embodiment, including the following steps:

A beamformee receives a request for obtaining channel information segments, where the request is transmitted by a beamformer within the duration of a current first transmission opportunity TXOP.

The beamformee transmits a first channel indication segment to the beamformer within the remaining duration of the first TXOP, and the beamformee transmits the second channel information segment to the beamformer within the duration of a third TXOP after the beamformer obtains the third TXOP. Alternatively, the total duration is long, and after the beamformee obtains the third TXOP, the beamformee transmits the second channel information segment to the beamformer within the duration of the third TXOP.

At least one of the channel information, the first channel information segment, and the second channel information segment is transmitted with data information to the beamformer.

Figure 10:
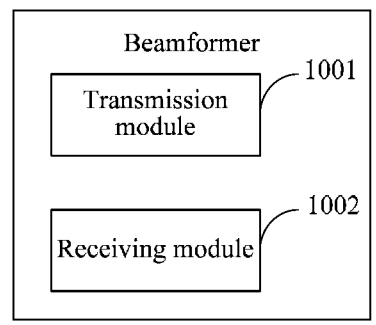
FIG. 10 is a structural diagram of a beamformer according to an embodiment of the present invention.

Referring to FIG. 10, an embodiment of the present invention provides a beamformer, including a transmitting module 1001 and a receiving module 1002.

The transmitting module 1001 is configured to transmit a request for obtaining channel information to a beamformee within the duration of a current first transmission opportunity TXOP; after the receiving module 1002 receives a null feedback frame, and if the beamformer obtains a second TXOP within the validity period of the channel information, transmit, within the duration of the second TXOP, a channel information indication frame to the beamformee to request the channel information.

The receiving module 1002 is configured to receive the null feedback frame transmitted by the beamformee within the duration of the first TXOP and receive the channel information transmitted by the beamformee within the duration of the second TXOP.

Figure 11:
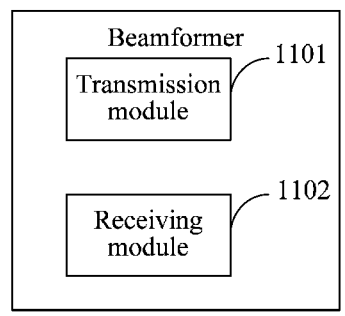
FIG. 11 is a structural diagram of another beamformer according to an embodiment of the present invention.

Alternatively, referring to FIG. 11, the beamformer includes a transmitting module 1101 and a receiving module 1102.

The transmitting module 1101 is configured to transmit a request for obtaining channel information to a beamformee within the duration of a current first TXOP; and after the receiving module 1102 receives a first channel information segment, if the beamformer obtains a third TXOP, transmit, within the duration of the third TXOP, a channel information indication frame to the beamformee to request the remaining channel information segments.

The receiving module 1102 is configured to receive the first channel information segment transmitted by the beamformee within the duration of the first TXOP, and receive a second channel information segment transmitted by the beamformee within the duration of the third TXOP.

In another embodiment of the present invention, the transmitting module 1001 or the transmitting module 1101 may be further configured to transmit management signaling to the beamformee, where the management signaling includes an indication information element used for indicating that the beamformer has the capability of receiving the currently requested channel information or channel information segments within a subsequent TXOP.

According to the embodiments, the beamformer transmits the channel information indication frame to request the channel information again, and receives the channel information or channel information segments transmitted by the beamformee, which prevents the beamformer from repeatedly transmitting the NDPA and the NDP to request the channel information, improves the efficiency, and saves the signaling resources.

In addition, the beamformer may transmit the management signaling to the beamformee to indicate that the beamformer has the capability of receiving the currently requested channel information or channel information segments within a subsequent TXOP, so that the beamformee does not discard the estimated channel information, which prevents the power waste caused by repeated channel information estimation. The segmentation may further reduce the time overhead.

Further, in another embodiment, a beamformer determines whether the duration of a TXOP is sufficient and determines whether to request in a subsequent TXOP. Therefore, the beamformer further includes: a determination module, configured to determine whether the remaining duration of a first TXOP is sufficient for transmitting the channel information, where the remaining duration of the first TXOP is the duration from the current time to the time when the first TXOP ends.

After the determination module is added, the beamformer may achieve the implementation described in the above method embodiments, and functional modules in the beamformer implement the processes and functions in the method. The determination module determines that the duration of the current first transmission opportunity TXOP is insufficient for transmitting the channel information. The transmitting module and the receiving module correspondingly implement the process and function of the solution where the beamformer determines whether to make a request in a subsequent TXOP.

Figure 12:
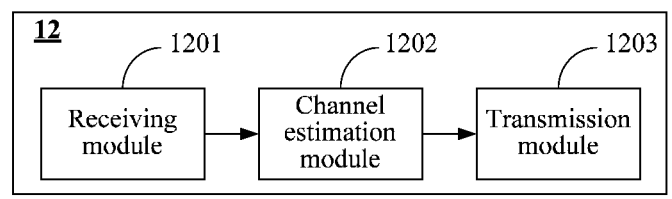
FIG. 12 is a structural diagram of a beamformee according to an embodiment of the present invention.

Referring to FIG. 12, this embodiment provides a beamformee 12, including a receiving module 1201, a channel estimation module 1202, and a transmitting module 1203.

The receiving module 1201 is configured to receive a request for obtaining channel information, where the request is transmitted by a beamformer within the duration of a current first transmission opportunity TXOP.

The channel estimation module 1202 is configured to, after the receiving module 1201 receives the request, perform channel estimation to obtain the channel information, and determine that the remaining duration of the first TXOP is insufficient for transmitting the channel information, where the remaining duration of the first TXOP is the duration from the current time to the time when the first TXOP ends.

The transmitting module 1203 is configured to transmit a null feedback frame to the beamformer within the remaining duration of the first TXOP; within the validity period of the channel information, if the beamformee obtains a second TXOP, transmit, within the duration of the second TXOP, the channel information to the beamformer; or segment the channel information into a first channel information segment and a second channel information segment, transmit the first channel information segment to the beamformer within the remaining duration of the first TXOP, and after the beamformee obtains a third TXOP, transmit the remaining second channel information segment to the beamformer within the duration of the third TXOP.

In another embodiment of the present invention, the transmitting module 1203 may be configured to transmit at least one of the channel information, the first channel information segment, and the second channel information segment with data information to the beamformer.

In another embodiment of the present invention, the receiving module 1201 may be configured to receive an acknowledgment ACK frame or a block acknowledgment BA frame returned by the beamformer.

In another embodiment of the present invention, the transmitting module 1203 is further configured to transmit management signaling to the beamformer, where the management signaling includes an indication information element used for indicating that the beamformee has the capability of storing and transmitting the channel information or the channel information segments currently requested by the beamformer within a subsequent TXOP.

According to the beamformee provided in this embodiment, the beamformee, if failing to transmit the channel information within the duration of the current first TXOP of the beamformer, transmits the channel information after obtaining the second TXOP, or transmits the first channel information segment within the duration of the first TXOP, and transmits the remaining second channel information segment after obtaining the third TXOP, which prevents repeated channel estimation of the beamformee and reduces power consumption. In addition, the beamformee actively transmits the channel information to the beamformer, and the beamformer does not need to transmit the channel information indication frame, which saves the signaling resources.

In addition, the beamformee may transmit the management signaling to the beamformer to indicate that the beamformee has the capability of storing and transmitting the channel information or channel information segments currently requested by the beamformer within a subsequent TXOP, which prevents the beamformer from retransmitting the NDPA and the NDP, improves the efficiency, and saves the signaling resources. The segmentation may further reduce the time overhead.

Figure 13:
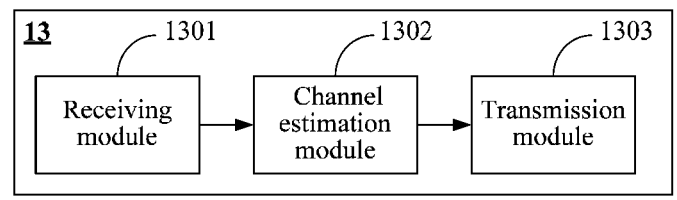
FIG. 13 is a structural diagram of another beamformee according to an embodiment of the present invention.

Referring to FIG. 13, this embodiment provides a beamformee 13, including a receiving module 1301, a channel estimation module 1302, and a transmitting module 1303.

The receiving module 1301 is configured to receive a request for obtaining channel information, where the request is transmitted by a beamformer within the duration of a current first transmission opportunity TXOP.

The channel estimation module 1302 is configured to perform channel estimation to obtain the channel information, and determine that the remaining duration of the first TXOP is insufficient for transmitting the channel information, where the remaining duration of the first TXOP is the duration from the current time to the time when the first TXOP ends.

The transmitting module 1303 is configured to transmit a null feedback frame to the beamformer within the remaining duration of the first TXOP; and within the validity period of the channel information, if the beamformer obtains a second TXOP and transmits a channel information indication frame, transmit the channel information to the beamformer; or configured to segment the channel information into a first channel information segment and a second channel information segment, transmit the first channel information segment to the beamformer within the remaining duration of the first TXOP, and transmit the remaining second channel information segment to the beamformer after the beamformer obtains a third TXOP and transmits a channel information indication frame.

In another embodiment of the present invention, the transmitting module 1303 may be configured to transmit at least one of the channel information, the first channel information segment, and the second channel information segment with data information to the beamformer.

In another embodiment of the present invention, the receiving module 1301 may be configured to receive an acknowledgment ACK frame or a block acknowledgment BA frame returned by the beamformer.

In another embodiment of the present invention, the transmitting module 1303 may be further configured to transmit management signaling to the beamformer, where the management signaling includes an indication information element used for indicating that the beamformee has the capability of storing and transmitting the channel information or channel information segments currently requested by the beamformer within a subsequent TXOP.

According to the beamformee provided in this embodiment, the beamformee, if failing to transmit the channel information within the duration of the current first TXOP of the beamformer, feeds back the channel information after the beamformer obtains the second TXOP and transmits the channel information indication frame; or segments the channel information into the first channel information segment and the second channel information segment, transmits the first channel information segment within the duration of the first TXOP, and transmits the second channel information segment after the beamformer obtains the third TXOP and transmits the channel information indication frame, which prevents repeated channel estimation of the beamformee and reduces power consumption.

In addition, the beamformee may transmit the management signaling to the beamformer to indicate that the beamformee has the capability of storing and transmitting the channel information or channel information segments currently requested by the beamformer within a subsequent TXOP, so that the beamformer may request the channel information again by using the channel information indication frame within the validity period of the channel information, which prevents the beamformer from retransmitting the NDPA and the NDP, improves the efficiency, and saves the signaling resources. The segmentation may further reduce the time overhead.

Further, the beamformee may still perform the implementation where the beamformer controls the progress of the channel information request and transmission. The functional modules correspondingly implement the processes and steps for receiving and transmission in the method embodiments.

Figure 14:
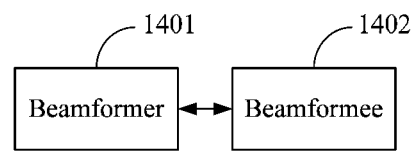
FIG. 14 is a structural diagram of a system for transmitting channel information according to an embodiment of the present invention.

Referring to FIG. 14, this embodiment provides a system for transmitting channel information, including a beamformer 1401 according to any one of the above embodiments, and a beamformee 1402 according to any one of the above embodiments.

According to the system for transmitting channel information in the embodiments of the present invention, the beamformer transmits the channel information indication frame to request the channel information again, and receives the channel information or channel information segments transmitted by the beamformee, which prevents the beamformer from repeatedly transmitting the NDPA and the NDP to request the channel information, improves the efficiency, and saves the signaling resources. In addition, the beamformee prevents repeated channel estimation and reduces power consumption. The segmentation may further reduce the time overhead.

In addition, it should be noted that the method, device, and system for transmitting channel information in the embodiments of the present invention provide multiple choices: The beamformee may transmit the channel information within its TXOP, or wait for the channel information indication frame from the beamformer; the beamformer may select to transmit the channel information indication frame within its next TXOP to request the channel information, or select to retransmit the NDPA and the NDP to request the channel information, which is more flexible in the applications.

It should be finally noted that persons of ordinary skill in the art may understand that all or part of the steps of the methods according to the embodiments may be implemented by a program instructing relevant hardware. The program may be stored in a computer readable storage medium. When the program is run, the processes of the methods according to the embodiments may be executed. The storage medium may be a magnetic disk, an optical disk, a read-only memory (ROM) or a random access memory (RAM).

Various functional units in the embodiments of the present invention may be integrated in a processing module, or be independent physical entities; or two or more than two functional units may be integrated into a module. The preceding integrated module may be not only implemented in the form of hardware, but also implemented in the form of a software functional module. If the integrated module is implemented in the form of a software functional module and functions as an independent product for sale or use, it may also be stored in a computer readable storage medium. The preceding storage medium may be a read-only memory, a magnetic disk, or an optical disk. The above devices and systems may perform the methods described in the method embodiments. In conclusion, the above are merely exemplary embodiments of the present invention. The scope of the present invention is not limited thereto. Variations, replacements, or improvements made without departing from the spirit and principle of the present invention shall fall within the protection scope of the present invention.

What is claimed is:

1. A method for obtaining channel information, comprising:

transmitting, by a beamformer, a request for obtaining the channel information to a beamformee within a duration of a current first transmission opportunity (TXOP);

when the beamformer determines that the duration of the current first TXOP is insufficient for receiving the channel information, and the beamformer obtains a second TXOP within a validity period of the channel information, transmitting, by the beamformer, a channel information indication frame to the beamformee to request the channel information within a duration of the second TXOP, and receiving, by the beamformer, the channel information transmitted by the beamformee.

2. The method according to claim 1, wherein the channel information indication frame comprises an indication information element identifying the channel information.

3. The method according to claim 1, further comprising:

transmitting, by the beamformer, management signaling to the beamformee, wherein the management signaling comprises an indication information element indicating that the beamformer has a capability of receiving the currently requested channel information within a subsequent TXOP.

4. A method for transmitting channel information, comprising:

receiving, by a beamformee, a request for obtaining the channel information, wherein the request is transmitted by a beamformer within a duration of a current first transmission opportunity (TXOP);

performing, by the beamformee, channel estimation to obtain the channel information;

when the beamformer determines that the duration of the current first TXOP is insufficient for receiving the channel information, and the beamformer obtains a second TXOP within a validity period of the channel information, receiving, by the beamformee, a channel information indication frame transmitted by the beamformer within a duration of the second TXOP; and transmitting, by the beamformee, the channel information to the beamformer.

5. The method according to claim 4, wherein the channel information and data information are together transmitted to the beamformer.

6. The method according to claim 4, wherein after the beamformee transmits the channel information, the method further comprises:

receiving, by the beamformee, an acknowledgment (ACK) frame or a block acknowledgment (BA) frame returned by the beamformer.

7. The method according to claim 4, further comprising:

transmitting, by the beamformee, management signaling to the beamformer, wherein the management signaling comprises an indication information element indicating that the beamformee has a capability of storing and transmitting the channel information currently requested by the beamformer within a subsequent TXOP.

8. A beamformer, comprising a transmitting module and a receiving module, wherein:

the transmitting module is configured to transmit a request for obtaining channel information to a beamformee within a duration of a current first transmission opportunity (TXOP); when the beamformer determines that the duration of the current first TXOP is insufficient for receiving the channel information, and the beamformer obtains a second TXOP within a validity period of the channel information, transmit a channel information indication frame to the beamformee to request the channel information within a duration of the second TXOP; and the receiving module is configured to receive the channel information transmitted by the beamformee.

9. The beamformer according to claim 8, wherein:

the transmitting module is further configured to transmit management signaling to the beamformee, wherein the management signaling comprises an indication information element indicating that the beamformer has a capability of receiving the currently requested channel information within a subsequent TXOP.

10. A beamformee, comprising:

a receiving module, configured to receive a request for obtaining channel information, wherein the request is transmitted by a beamformer within a duration of a current first transmission opportunity (TXOP);

a channel estimation module, configured to perform channel estimation to obtain the channel information;

when the beamformer determines that the duration of the current first TXOP is insufficient for receiving the channel information, and the beamformer obtains a second TXOP within a validity period of the channel information, the receiving module is further configured to receive a channel information indication frame transmitted by the beamformer within a duration of the second TXOP; and a transmitting module, configured to transmit the channel information to the beamformer.

11. The beamformee according to claim 10, wherein the transmitting module is configured to transmit the channel information and data information to the beamformer together.

12. The beamformee according to claim 10, wherein the receiving module is further configured to receive an acknowledgment (ACK) frame or a block acknowledgment (BA) frame returned by the beamformer.

13. The beamformee according to claim 10, wherein the transmitting module is further configured to transmit management signaling to the beamformer, wherein the management signaling comprises an indication information element indicating that the beamformee has a capability of storing and transmitting the channel information currently requested by the beamformer within a subsequent TXOP.

* * * * *